US008161352B2

(12) United States Patent
Sayadi et al.

(10) Patent No.: US 8,161,352 B2
(45) Date of Patent: Apr. 17, 2012

(54) METHOD FOR PROVIDING UNEQUAL ERROR PROTECTION TO DATA PACKETS IN A BURST TRANSMISSION SYSTEM

(75) Inventors: Bassem Sayadi, Sceaux (FR); Marie Line Alberi-Morel, Cachan (FR)

(73) Assignee: Alcatel Lucent, Paris (FR)

( * ) Notice: Subject to any disclaimer, the term of this patent is extended or adjusted under 35 U.S.C. 154(b) by 964 days.

(21) Appl. No.: 12/147,576

(22) Filed: Jun. 27, 2008

(65) Prior Publication Data

US 2009/0006927 A1 Jan. 1, 2009

(30) Foreign Application Priority Data

Jun. 28, 2007 (EP) .................................. 07301171

(51) Int. Cl.
*H03M 13/00* (2006.01)

(52) U.S. Cl. ...................................................... 714/762

(58) Field of Classification Search .................. 714/788, 714/762

See application file for complete search history.

(56) References Cited

U.S. PATENT DOCUMENTS

| | | | | |
|---|---|---|---|---|
| 4,916,701 A * | 4/1990 | Eggenberger et al. | ........ | 714/758 |
| 5,881,073 A * | 3/1999 | Wan et al. | ...................... | 714/786 |
| 6,671,518 B2 * | 12/2003 | Harris et al. | .................. | 455/518 |
| 6,901,550 B2 * | 5/2005 | Adar et al. | ..................... | 714/762 |
| 7,225,388 B2 * | 5/2007 | Ejima et al. | .................... | 714/762 |
| 7,802,167 B1 * | 9/2010 | Gorshe | ......................... | 714/762 |
| 2003/0105625 A1 * | 6/2003 | Harris et al. | .................. | 704/201 |
| 2006/0262810 A1 * | 11/2006 | Vadakital et al. | ............. | 370/473 |
| 2008/0263428 A1 * | 10/2008 | Eerenberg et al. | ............. | 714/762 |
| 2010/0031121 A1 * | 2/2010 | Ottavj et al. | .................. | 714/762 |

FOREIGN PATENT DOCUMENTS

| WO | 02/45324 A1 | 6/2002 |
|---|---|---|
| WO | 03/045000 A1 | 5/2003 |
| WO | 2006/123231 A1 | 11/2006 |

OTHER PUBLICATIONS

J. Boyce, "Packet Loss Resilent Transmission of MPEG Video Over the Internet", Signal Processing. Image Communication, Elsevier Science Publishers, Amsterdam, Netherlands, vol. 15, No. 1/2, Sep. 1999, pp. 7-24 XP000867165.
Luc Ottavj et al, Multi Burst Sliding Encoding (MBSE)—UDCast 2007—May 2, 2007.

* cited by examiner

*Primary Examiner* — Robert Beausoliel, Jr.
*Assistant Examiner* — Neil Miles
(74) *Attorney, Agent, or Firm* — Fay Sharpe LLP

(57) ABSTRACT

The present invention relates to a method for providing an equal error protection to data packets in a burst transmission system. The data packets are grouped based upon respective priority levels and error protection is provided to each group of data packets based upon the respective priority level. The error protection codes for each group of data packets depending on the respective priority level is created using data of data packets of the group which are contained in the data section (20) of two or more bursts (10) forming a first set of bursts (50, 50.B, 50.E, 55) and the created error protection codes are transmitted in the error protection section (30) of one or more bursts (10) forming a second set of bursts (60, 60.B, 60.E, 65). The invention further relates to a burst transmission system for performing said method.

8 Claims, 7 Drawing Sheets

METHOD FOR PROVIDING UNEQUAL ERROR PROTECTION TO DATA PACKETS IN A BURST TRANSMISSION SYSTEM

The invention is based on a priority application EP 07 301 171.0 which is hereby incorporated by reference.

TECHNICAL FIELD

The invention relates to a method for providing unequal error protection to data packets in a burst transmission system. Each burst comprises a data section and an error protection section. The data section of each burst comprises one or more data packets and the error protection section of each burst comprises error protection codes. The data packets are grouped based upon respective priority levels. The invention also relates to a burst transmission system for performing said method.

BACKGROUND OF THE INVENTION

An example for such a burst transmission system is the handheld enhancement of the DVB (Digital Video Broadcasting) system. The DVB-H enhancements to the DVB-T (Digital Video Broadcasting Terrestrial) specifications include a forward error correction computed across the data section of a burst. The forward error correction code is placed in the error protection section of the same burst over which data section the error protection code has been computed. An example of such forward error correction is implemented in DVB-H as well as DVB-SH. The DVB-H as well as the DVB-SH (DVB satellite to handheld) both implement the multi-protocol encapsulation. The multi-protocol encapsulation (MPE) encapsulates multiple types of data, especially IP (Internet Protocol) datagrams into the data section of a burst. DVB-H/SH also implements the MPE-FEC (Multi Protocol Encapsulation-Forward Error Correction). MPE-FEC is the link layer error protection of DVB-H and DVB-SH. MPE-FEC provides intra burst data protection. A MPE-FEC frame is a matrix of 255 columns and a variable number of rows, e. g. 256, 512, 768, or 1024. Each element in the matrix of the MPE-FEC frame represents a byte. An MPE-FEC frame is an example of a burst. The first 191 columns of the MPE-FEC contain the IP datagrams that will be transmitted. This portion is the data section of the burst and is also called application data table (ADT). The rest of the 64 columns are dedicated to the forward error correction (FEC) generated by for example an eraser code, such as Reed Solomon, LDPC (Low Density Parity Check Code), etc. The FEC is contained in the error protection section of the burst. The FEC is also called RSDT (Reed Solomon Data Table) or inner-FEC. The inner-FEC is computed over the rows of the metrics ADT. It involves 1 D error correction, which is for example a FEC computed on each row of the ADT metrics. The redundancy created by the inner-FEC protects the loss of one datagram in one burst. Thus, the inner-FEC can insure an intra burst protection.

In a wireless network, such as DVB-H, DVB-SH, WiMAX (Worldwide Interoperability for Microwave Access), 3G/LTE (3rd Generation Long Term Evolution), end users have different requirements in terms of latency video visual quality, processing capabilities and power. It is thus a challenge especially for broadcast services to design a delivery mechanism that not only achieves efficiency in network bandwidth but also meets the heterogeneous requirement and capacities of the end users. To address the above challengers the different quality of service requirements in all components of a media delivery system from end to end should be supported simultaneously. Examples of such media delivery systems are voice service, http services etc.

Another example of such a media delivery system is a video delivery system which transmits scalable encoded video. Scalable video encoding is an advantageous way to meet the needs to achieve efficiency in network bandwidth and also to meet the heterogeneous requirement and capacities of the end users. In scalable video coding the signal is separated into multiple layers. The layers have different priorities. The base layer is the layer of highest priority. It can be independently decoded and provides basic video quality. The base layer must be robust to be received by users over all the network, what ever the radio conditions or the radio link quality might be. The enhancement layers can only be decoded together with the base layer and further increase the video quality and/or the video basic special and temporal resolution. The base layer in connection with the enhancement layer or enhancement layers provide video with the enhanced quality. Each terminal decodes at least the base layer and a number of enhancement layers that is linked to the capabilities of the terminal. Using scalable video layers allows networks providing multimedia broadcast and multicast services to adapt efficiently to the variability of the radio conditions, e. g. variable carrier to interference ratio or signal to noise ratio. It allows to optimise the usage of the radio resources using modulation and coding schemes leading to higher spectrum efficiency. Terminals experiencing bad radio link quality for example decode only the base layer, e. g. typically users at the edge of a cell for example. The base layer must be enough robust to be received by users all over the network or cell what ever the radio conditions or the radio link quality are. This can be achieved by choosing an adequate modulation and coding scheme. The enhancement layers are decoded only even the radio link quality is good, e. g. typically users near the antenna. The enhancement layer or the enhancement layers are differently protected than the base layer. They are usually less protected than a base layer e. g. by using a less robust modulation and coding scheme but leading to higher radio data rate.

In the document "Multi burst sliding encoding (MBSE)" of Luc Ottavj, Antoine Clerget, Amine Ismail, which was presented during a technical working group within the DVB-SSP (DVB satellite service to portable devices) standardization, an outer-FEC algorithm is presented which extends the intra-burst protection to an inter-burst protection, so that complete burst losses may be recovered. In order to achieve this, data coming from several bursts are interleaved before FEC protection is applied.

In the US patent application 2006/0262810 A1 a method for providing error protection to data packets in a burst transmission system is described. Error protection is provided unequally with respect to priority levels of the data packets. The error protection provided is inserted within one burst, thus protecting the loss of one data packet in one burst. The unequal error protection provided calculates the error protection code over the data section of one burst and puts the calculated error code in the error protection section of said same burst.

The object of the invention is to provide a method for providing unequal error protection to data packets in a burst transmission system with extended protection. Another object of the invention is to provide a burst transmission system with unequal error protection for data packets with extended protection.

SUMMARY OF THE INVENTION

These objects and other objects are solved by the features of the independent claims. Features of preferred embodiments of the invention are found in the dependent claims.

The invention provides a method for providing unequal error protection to data packets in a burst transmission system e. g. DVB-H or DVB-SH system. Each burst comprises a data section and an error protection section. The data section of each burst comprises one or more data packets and the error protection section of each burst comprises error protection codes. The data packets to be transmitted are grouped based upon respective priority levels, e. g. different layers of e. g. coded video data or other layered coded media data. The error protection provided to each group of data packets is based upon the respective priority level of the data packets. The error protection is provided by error protection codes contained in the error protection section of the bursts. The error protection codes for each group of data packets are created using data of data packets of said group which are contained in the data section of two or more bursts forming a first set of bursts. This means that error codes are computed using data of data packets belonging to the group of data packets which are contained in two or more bursts. The created error protection codes are then transmitted in the error protection section of one or more bursts forming a second set of bursts.

The present invention extends the error protection over more than one burst. This enables recovery of consecutive bursts loss. It is adapted to media having long interruptions or fade outs, e. g. by a number of obstacles that may be responsible for a complete interruption of the signal of several seconds with the direct satellite link to a mobile phone.

According to a preferred embodiment of the invention the first set of bursts is disjoint from the second set of bursts. This ensures that the data from which the error codes are computed is contained in completely different bursts from the bursts in which the error codes are contained. The second set of bursts may follow immediately the first set of bursts in this embodiment. This enables rapid recovery of bursts when there has been a fade out in the transmission connection.

According to another preferred embodiment of the invention the first set of bursts has a non-empty intersection with the second set of bursts, i. e. the first set of bursts overlaps with the second set of bursts. This means that the error codes generated over the data sections of the first set of bursts are contained in the error protection section of bursts which are possibly also part of the first set of bursts. This ensures a faster recovery possibility after a fate out in the transmission connection.

The unequal error protection is preferably achieved by using different numbers of bursts contained in the first set of bursts for different groups of data packets. Data packets within one group belong to the same priority level. For different priority levels the error protection codes are generated over a different number of bursts. This allows to balance the required security level of protection and the generated redundancy according to different priorities.

According to a preferred embodiment of the invention the second set of bursts used for transmitting the error protection codes for a group of data packets of a higher priority contains a higher number of bursts in the second set of bursts used for transmitting the error protection codes for a group of data packets of lower priority. This allows to spread the error protection codes over more bursts for higher priority data packets. This allows for balancing required error protection and overhead.

According to a preferred embodiment of the invention the groups of data packets correspond to layers of layered encoded data, e. g. layered encoded video data. Layered encoded video data is also known as scalable video. Scalable video can be seen as multiple, e. g. two or more hierarchical additive layers. This can be for example a basic layer providing a basic video quality and one or more enhancement layers providing finer quality improvements. The basic layer then corresponds to the highest priority layer. Packets of the basic layer of the video data are packets with the highest priority level. The data packets of the enhancement layers are of lower priority.

The invention also concerns a burst transmission system, in particular a wireless burst transmission system such as a DVB-H or DVB-SH system. Each burst within said burst transmission system comprises a data section and an error protection section. The data section of each burst comprises one or more data packets and the error protection section of each burst comprises error protection codes. The data packets are grouped based upon respective priority levels and unequal error protection is provided to each group of data packets based upon the respective priority level. The error protection is provided by said error protection codes contained in the error protection section of the bursts. The burst transmission system comprises means for creating the error protecting codes for each group of data packets using data of data packets of said group which are contained in the data section of two or more bursts performing a first set of bursts. The burst transmission system further comprises means for transmitting the created error protection codes in the error protection section of one or more bursts performing a second set of bursts. This allows for an error protection extending beyond one burst.

According to a preferred embodiment of the burst transmission system the unequal error protection is provided to groups of data packets which correspond to layers of layered encoded video data.

BRIEF DESCRIPTION OF THE DRAWINGS

Other characteristics and advantages of the invention will become apparent in the following detailed description of preferred embodiments of the invention illustrated by the accompanying drawings given by way of non-limiting illustrations.

DETAILED DESCRIPTION OF PREFERRED EMBODIMENTS

Figure 1:
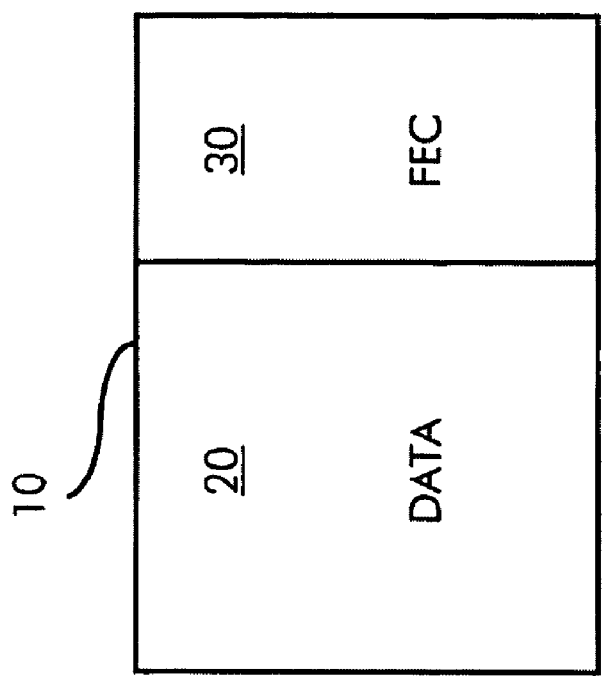
FIG. 1 shows a schematic overview over one burst.

FIG. 1 shows a schematic overview of a burst 10 comprising a data section 20 and an error protection section 30. Comprised in the error protection section 30 are error protection codes for protecting intra burst loss and protection codes for protecting against losses extending over more than one burst. Intra burst error protection is for example done by MPE-FEC in the case of DVB-H or DVB-SH.

In the case of layered video transmission, the layers of unequal importance of a scalable video scheme should advantageously lead to an unequal error protection policy within the network. The unequal error protection according to the invention is provided by applying the extra burst error protection as shown for example in FIG. 2 according to priority levels of groups of data packets.

Figure 2:
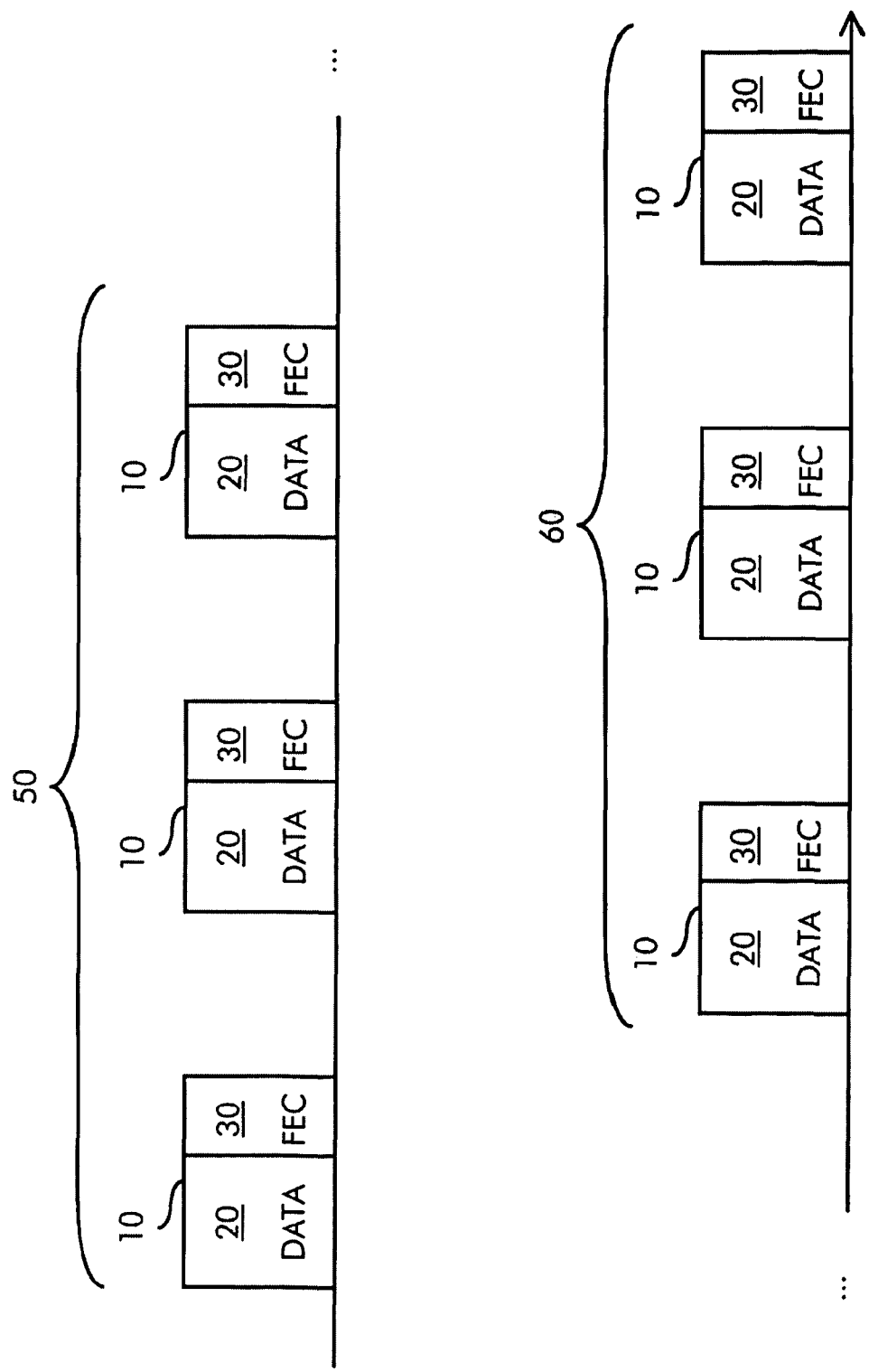
FIG. 2 shows a schematic overview over a first set of bursts and a second set of bursts.

FIG. 2 shows an example of extra burst error protection for a group of data packets. Extra burst error protection extends the error protection beyond the borders of one single burst. Shown in FIG. 2 are bursts 10 each comprising a data section 20 and an error protection section 30. Error protection for data packets belonging to a group of data packets of the same priority level is provided by calculating error protection codes using data of data packets of bursts contained in a first set of bursts 50. The calculated error protection codes are transmitted in the error protection section 30 of bursts 10 belonging to a second set of bursts 60. In the example shown in FIG. 2 the first set of bursts 50 is disjoint from the second set of bursts 60. A second set of bursts 60 follows the first set of bursts 50 in time. The error protection sections 30 of the bursts 10 also contain error protection codes for protecting intra burst losses. These error protection codes for protecting against intra burst losses are calculated over data contained in the data section 20 of the same burst 10.

Figure 3:
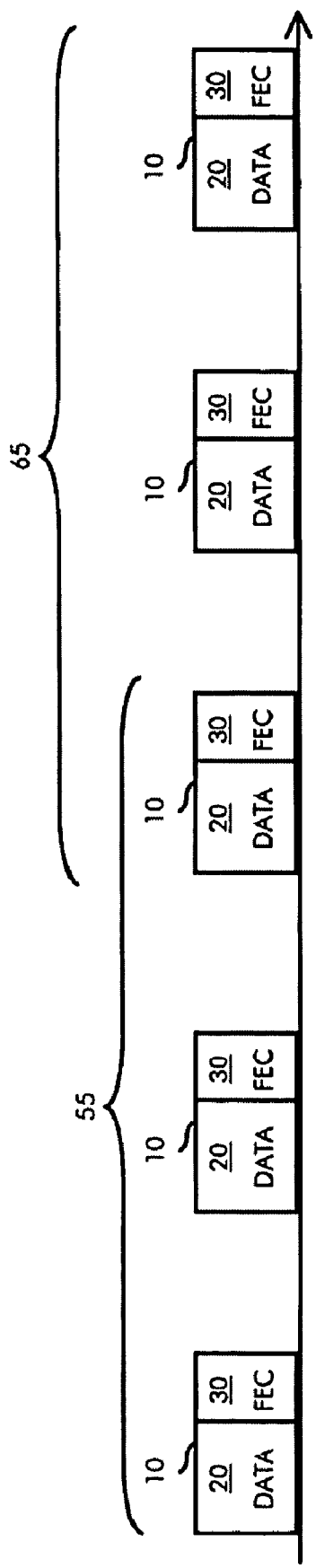
FIG. 3 shows an overview over a first set of bursts and a second set of bursts.

FIG. 3 shows an example of extra burst error protection where the first set of bursts 55 has a non-empty intersection with the second set of bursts 65. The example shown in FIG. 3 also provides error protection for a group of data packets belonging to the same priority level. As for the example of FIG. 2 unequal error protection for groups of data packets of different priority levels can be provided by varying the number of bursts contained in the first set of bursts 50, 55 and the second set of bursts 60, 65.

In the example shown in FIG. 3 extra burst error protection is provided by calculating error protection codes over data contained in the bursts 10 of a first set of bursts 55. Those calculated error codes are transmitted in the error protection section 30 of a group of bursts 10 of a second set of bursts 65. The first set of bursts 55 overlaps with a second set of bursts 65.

The quality degradation in a video transmission over radio compared to a perfect transmission is mainly determined by the packet lost behaviour observed at the video decoder. The propagation channel presents many impairments, e. g. deep fading, shadowing, etc., leading to a bursty packet loss. If one packet is lost it is very likely that consecutive packets will also be lost. In order to offer the video service to all the terminals in the cellular broadcast network, the base layer of video must be protected more than the enhancement layers, as the enhancement layers have less importance to the video decoding. The base layer can therefore be protected more by calculating more redundancy in the inner forward error correction codes. Inner forward error correction means that intra burst loss of a packet is protected by the error codes in the error correction section of said same burst. In the case of shadowing or deep fading for example a whole burst can be lost so. This would mean that the video service would be interrupted. The presented inventive method resolves this problem by the extra burst forward error correction. The extra burst error correction can be advantageously coupled to the inner burst error correction.

The intra burst error correction is computed on the number N of the rows of a burst. The intra burst error correction is characterised by its rate equalling $M/(M+K)$. In this equation M denotes the number of columns in the data section of the burst K denotes the number of columns in the error protection section of the burst. The extra burst error correction computed from the columns of successive bursts leads to a rate equalling $C/(C+S)$. The parameter C gives the number of successive bursts, C contained in the first set of bursts 50 or 55. The parameter S gives the number of bursts on which the extra burst error correction codes are spread. S is the number of bursts contained in the second set of bursts 60 or 65. In global this gives the coding rate of inner protection coding rate plus extra burst protection coding rate. The global coding rate is the sum of the intra burst protection coding rate plus the extra burst protection coding rate.

The parameters K, C, and S must be well chosen to keep the global protection coding rate at an acceptable level.

The invention focuses on varying the rate of coding of the extra burst error protection to ensure a high protection for the base layer and to keep a good bandwidth efficiency. Thus K is kept fixed for the following examples. Of course K can be varied in order to further increase the protection for the base layer. The variation of K can be advantageously combined with the variation of C and S.

The rate of extra burst error protection can be denoted by $\alpha$. $\alpha$ is then given by $C/(C+S)$. This can be transformed to $S=(1/\alpha-1)C$.

Figure 4:
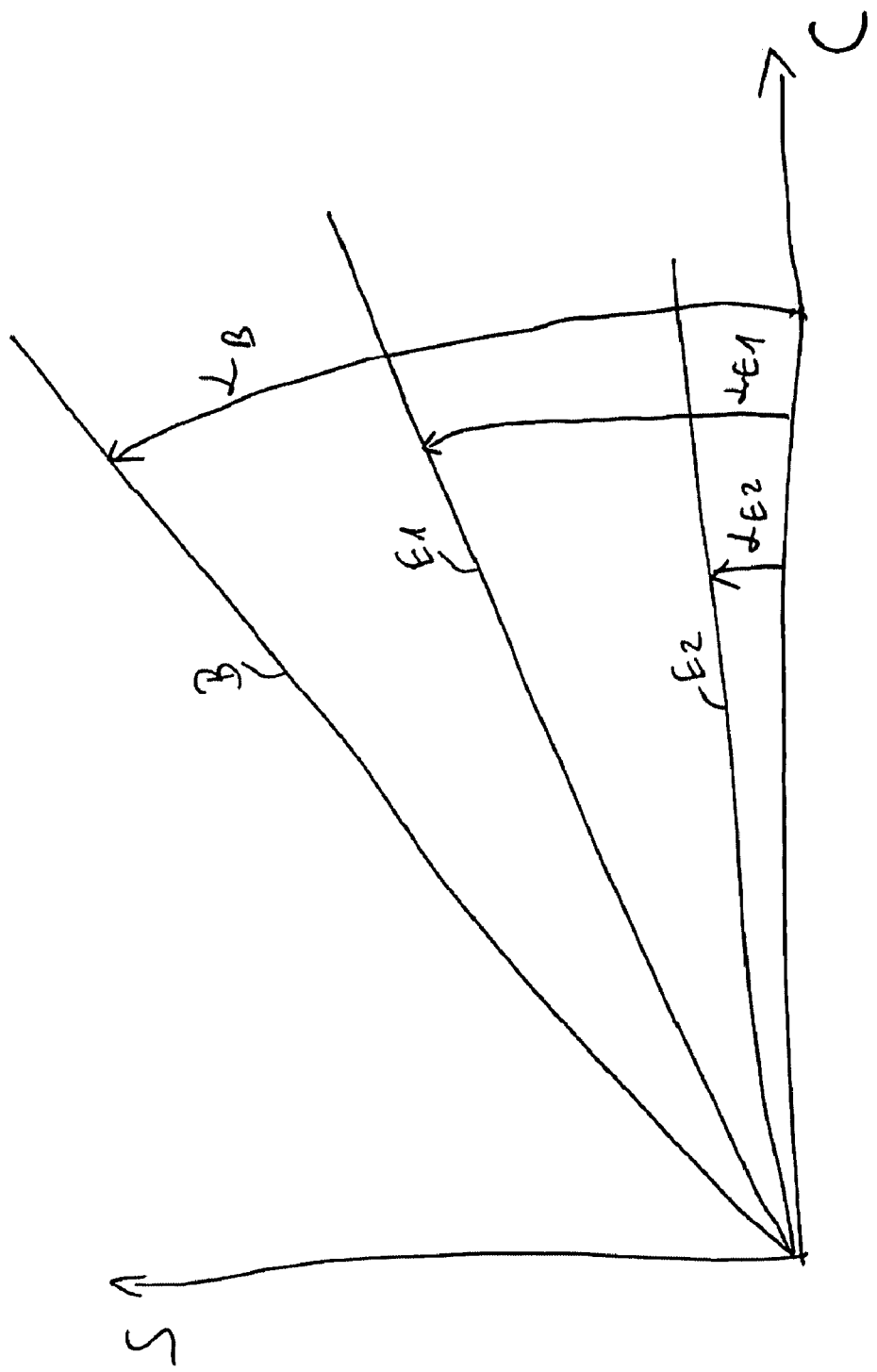
FIG. 4 shows an example of parameterization for error protection parameters.

In FIG. 4 are shown three lines of possible parameter choices. Assuming that there is one base layer the extra burst error protection coding rate is given by $\alpha_B$. Assuming that there are two enhancements layers E2 and E1 the extra burst error protection coding rates are given by $\alpha_{E2}$ and $\alpha_{E1}$. The lines with the corresponding angle $\alpha_B$, $\alpha_{E1}$ or $\alpha_{E2}$ give the parameter choices sets for possible parameter combinations of S and C for the respective layers. In FIG. 4 the different curve of variations of S depending on the value of C are plotted. There is an infinity of solutions to fix the values of C and S. The choice of the values for C and S will advantageously be done by the operator of the telecommunication network or the operator of the service provider, e. g. the video service provider.

In general the protection is higher when the parameter $\alpha$ is lower. This is the reason why the parameter $\alpha_B$ shown in FIG. 4 is larger than the parameter $\alpha_{E1}$ for the first enhancement layer and larger than the parameter $\alpha_{E2}$ for the second enhancement layer E2 as shown in FIG. 4.

Figure 5:
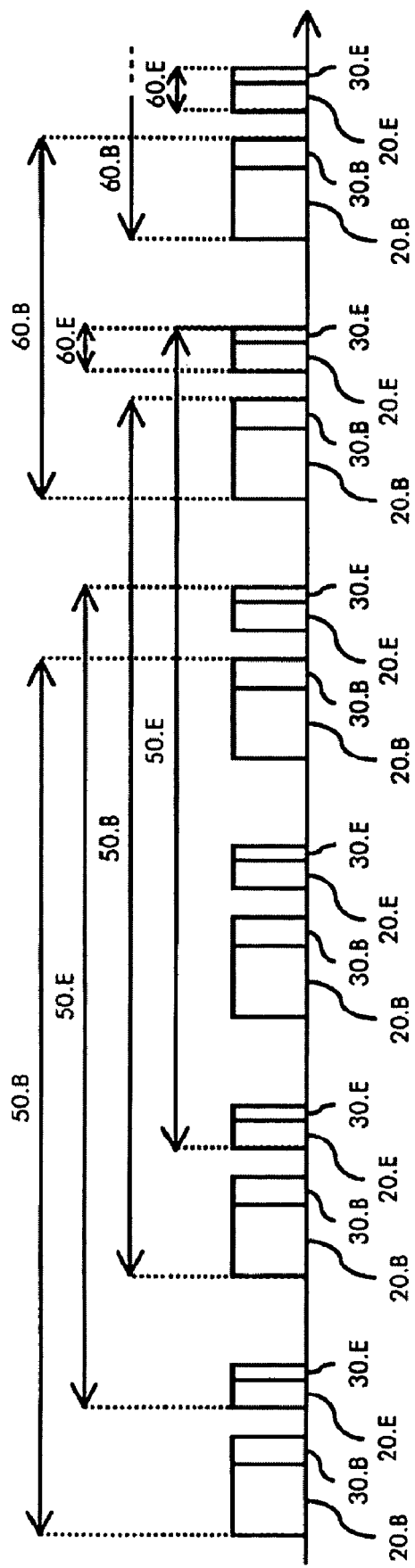
FIGS. 5-7 show examples of unequal error protection.
Figure 6:
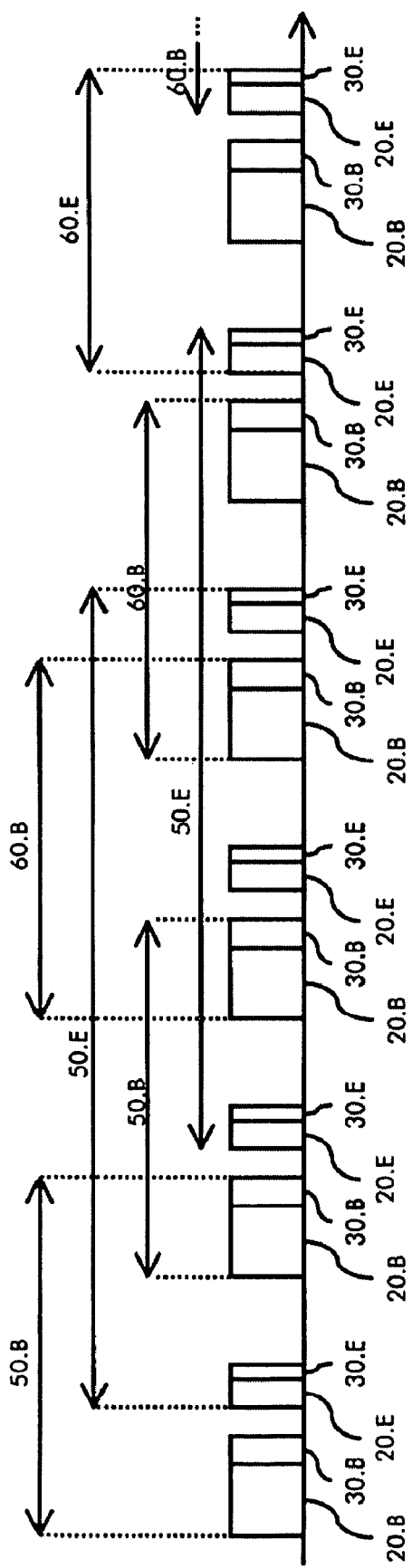
Figure 7:
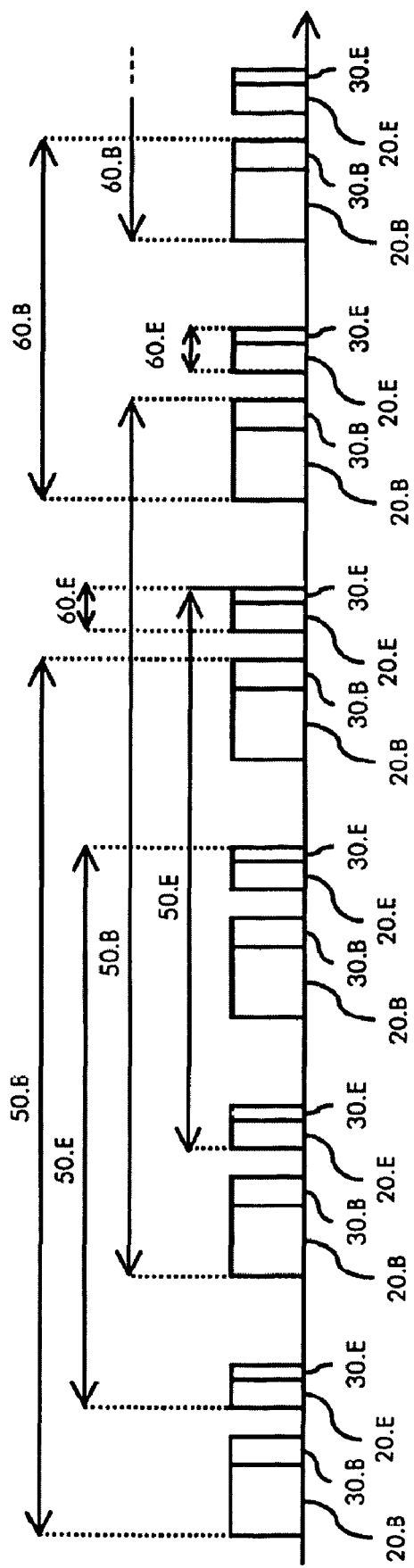

In FIGS. 5, 6, and 7 examples of three extra burst protection schemes are given.

For a given C (C fixed) increasing S leads to a lower $\alpha$. A lower $\alpha$ leads to a higher protection. Allowed value of S allows thus to obtain more redundancy. The first example of a scheme shown in FIG. 3 therefore spreads the error protection codes generated from the basic flow B over a higher burst number S then the protection codes generated from the enhancement flow E. C is kept constant. In this case the protection inequality lays in the redundancy quantity.

It is shown in FIG. 5 that for the basic layer B the first set of bursts 50.B comprises four bursts. The first set of bursts for the enhancement layer E 50.E comprises also four bursts. The parameter C is thus kept constant. The second set of bursts for the base layer 60.B contains two bursts. The second set of bursts 60.E for the enhancement layer contains only one burst. Redundancy is thus increased by using a higher number of bursts for the second set of bursts 60.B for the base layer than for the second set of bursts 60.E for the enhancement layer.

For the example given in FIG. 6 the parameter S is kept fixed. Increasing C thus leads to a higher value of $\alpha$. The extra burst error protection protects less in this case. Indeed, the ratio of the redundancy quantity to the data quantity decreases which leads to the diminution of the correction capacity of the error correction. Thus, the example given in FIG. 6 uses a lower number of successive bursts C for generating the error correction code in the basic flow case than in the enhancement flow case.

The number of bursts contained in the second set of bursts 60.B and 60.E is equal to 2 for both basic layer and the enhancement layer in FIG. 6. The parameter S is thus equal to 2 for the example given in FIG. 6. The number of bursts contained in the first set of bursts 50.B for the basic layer is 2 for the example given in FIG. 6. The number of bursts contained in the first set of bursts 50.E for the enhancement layer is equal to 4 for the example given in FIG. 6.

However, in the scheme given in FIG. 6 the protection against the lost burst recovery of the base layer is dramatically reduced. Indeed, the lower the value for the parameter C, which is the number of bursts contained in the first set of bursts, the number of bursts recovered when lost is reduced. For this reason the value for the parameter C should be increased to enable a terminal to receive the base layer even in a presence of large shadowing and deep fading, as is the case for example when the terminal is located under a bridge. In order to keep some correction capacity for large C values S must be increased as well.

This leads to a third example of extra burst error correction as shown in FIG. 7. The example shown in FIG. 7 uses a higher number of successive bursts C for generating the error correction code on the base flow than in the enhancement flow case. As shown in FIG. 7 the first set of bursts 50.B for the base layer comprises 4 bursts. The first set of bursts 50.E for the enhancement layer comprises 3 bursts. The value for S is different for both flow types as well. It is adapted to the values for the parameters C in order to keep a good correction capacity for the base layer B. The value for S is 1 for the second set of bursts 60.E for the enhancement layer. The number of bursts contained in the second set of bursts for the basic layer 60.B is 2.

All the examples given above lead to an unequal error protection for different priority groups of media data, e. g. different layers of video and data providing an extra burst error correction.

The invention claimed is:

1. A method for providing unequal error protection to data packets in a burst transmission system, wherein each burst comprises a data section and an error protection section and wherein the data section of each burst comprises one or more data packets and the error protection section of each burst comprises error protection codes, and wherein the data packets are grouped based upon respective priority levels, the method comprising the step of providing error protection to each group of data packets based upon the respective priority level, whereas the error protection is provided by said error protection codes, and the method being whereby the steps of creating said error protection codes for each group of data packets using data of data packets of said group which are contained in the data section of two or more bursts forming a first set of bursts, and transmitting said created error protection codes in the error protection section of one or more bursts forming a second set of bursts, whereby the first set of bursts are disjoint from the second set of bursts.

2. The method according to claim 1, further whereby the number of bursts contained in the first set of bursts used for creating the error protection codes for a group of data packets of a higher priority being different than the number of bursts contained in the first set of bursts used for creating the error protection codes for a group of data packets of a lower priority.

3. The method according to claim 1, further whereby the second set of bursts used for transmitting the error protection codes for a group of data packets of a higher priority containing a higher number of bursts than the second set of bursts used for transmitting the error protection codes for a group of data packets of a lower priority.

4. The method according to claim 1, further whereby the groups of data packets corresponding to layers of layered encoded media data, in particular layered encoded video data.

5. A burst transmission system, wherein each burst comprises a data section and an error protection section and wherein the data section of each burst comprises one or more data packets and the error protection section of each burst comprises error protection codes, and wherein the data packets are grouped based upon respective priority levels, and wherein unequal error protection is provided to each group of data packets based upon the respective priority level, whereas the error protection is provided by said error protection codes, characterized by means for creating said error protection codes for each group of data packets using data of data packets of said group which are contained in the data section of two or more bursts forming a first set of bursts, and means for transmitting said created error protection codes in the error protection section of one or more bursts forming a second set of bursts, wherein the first set of bursts are disjoint from the second set of bursts.

6. The burst transmission system according to claim 5, further wherein the groups of data packets corresponding to layers of layered encoded video data.

7. The burst transmission system according to claim 5, further whereby the number of bursts contained in the first set of bursts used for creating the error protection codes for a group of data packets of a higher priority being different than the number of bursts contained in the first set of bursts used for creating the error protection codes for a group of data packets of a lower priority.

8. The burst transmission system according to claim 5, further whereby the second set of bursts used for transmitting the error protection codes for a group of data packets of a higher priority containing a higher number of bursts than the second set of bursts used for transmitting the error protection codes for a group of data packets of a lower priority.

* * * * *